United States Patent
McFarland et al.

[15] 3,691,640
[45] Sept. 19, 1972

[54] DISC BRAKE ROTOR THICKNESS WEAR AND SCORE DEPTH GAUGE AND METHOD OF USING SAME

[72] Inventors: Frederick R. McFarland; Walter L. Diffenderfer, both of Lancaster, Pa.

[73] Assignee: K-D Manufacturing Company, Lancaster, Pa.

[22] Filed: March 22, 1971

[21] Appl. No.: 101,154

Related U.S. Application Data

[63] Continuation of Ser. No. 830,029, June 3, 1969, abandoned.

[52] U.S. Cl. ............................................. 33/147 F
[51] Int. Cl. ............................................. G01b 5/00
[58] Field of Search..33/147 A, 147 J, 147 H, 147 M

[56] References Cited

UNITED STATES PATENTS

| | | |
|---|---|---|
| 744,796 | 11/1903 | Reilly ........................... 33/147 |
| 2,134,262 | 10/1938 | Phillips ......................... 33/148 |
| 904,560 | 11/1908 | Pierpont ....................... 33/147 |
| 1,358,794 | 11/1920 | Stewart ........................ 33/147 |
| 836,605 | 11/1906 | Provandie .................... 33/147 |

FOREIGN PATENTS OR APPLICATIONS

| | | |
|---|---|---|
| 157,628 | 1/1921 | England ........................ 33/147 |

*Primary Examiner*—Leonard Forman
*Assistant Examiner*—A. J. Mirabito
*Attorney*—Paul & Paul

[57] ABSTRACT

A gauge is provided with a plate for positioning the gauge against one surface of a part to be measured, and a biased pointer for engaging the opposite surface of the part. Means are provided for permitting the pointer to be moved perpendicularly with respect to the plate. One edge of the pointer is a gear which meshes with a gear to drive an indicator which amplifies the gauge reading on an arcuate scale. A second indicator can be moved independently to a plurality of fixed positions on the scale.

4 Claims, 3 Drawing Figures

PATENTED SEP 19 1972 3,691,640

INVENTORS
FREDERICK R. McFARLAND &
WALTER L. DIFFENDERFER
BY
PAUL & PAUL
ATTORNEYS

DISC BRAKE ROTOR THICKNESS WEAR AND SCORE DEPTH GAUGE AND METHOD OF USING SAME

CROSS REFERENCE TO RELATED APPLICATION

This application is a continuation of our prior copending application for a Disc Brake Rotor Thickness Wear and Score Depth Gauge, Ser. No. 830,029, now abandoned filed, June 3, 1969 and discloses and claims the subject matter in that application.

BACKGROUND OF THE INVENTION

This invention relates to hand operated gauges of the caliper type for measuring the thickness of parts, and more particularly, to a manual gauge for measuring the thickness of the rotor or disc in a disc brake and the depth of the score marks, if any, in the surface of the rotor.

Disc brakes used on automobiles comprise a rotor mounted to a shaft which turns between a pair of shoes disposed about the opposite faces of the disc or rotor. Fluid pressure exerts force on pistons to press the linings of the shoes against the rotor faces. As in conventional brakes, the linings wear and the surfaces against which they are pressed wear. Just as in conventional brakes, these surfaces must be periodically inspected, for safety reasons, and many states are now requiring such an inspection.

It is desirable to provide a gauge which is simple to use, and which may readily be operated by a mechanic to give an accurate determination of the depth of any score lines on the rotor and of the overall wear of the rotor. At the same time it is desirable to have a device which is sufficiently small to be carried within the pocket of the mechanic and which, while giving a clear easily readable presentation of the measurement made, is capable of making very slight destinctions and highly accurate measurements.

SUMMARY OF THE INVENTION

This invention comprises a body having a base portion and measuring means moveable toward and away from said base portion, said body including a scale and having mounted thereon in engagement with said measuring means indicating means for movement in response to movement of said measuring means to indicate distances measured from said base portion on said scale. In the preferred embodiment of the invention auxiliary indicating means are provided which can be preset to a plurality of positions on said scale.

Accordingly, it is an object of this invention to provide a compact gauge capable of accurately indicating wear and thickness of a scored rotor.

This and other objects of our invention will become apparent from the following description with reference to the accompanying drawings.

DESCRIPTION OF THE PREFERRED EMBODIMENTS

Figure 1:
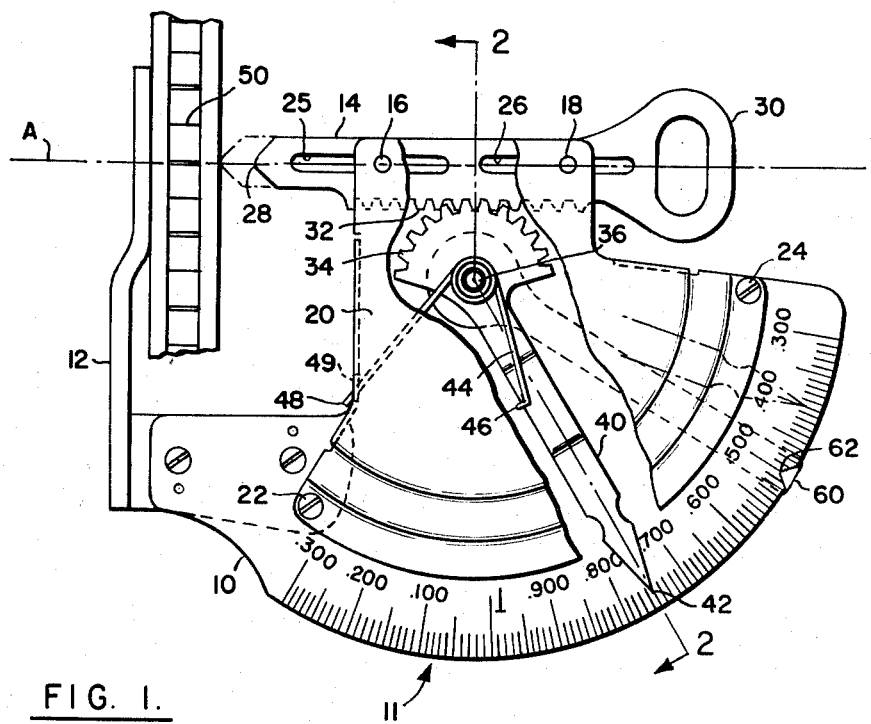
FIG. 1 is a plan view of our invention partially broken away for the sake of clarity and showing a brake rotor in operative position with the device; with alternate positions shown in phantom.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, the gauge shown comprises a body 10 which includes a flat arcuate portion having indicia forming a scale 11 thereon along the arcuate edge thereof. The scale is incremented to give readings in units of 0.010 inches from 0.300 to 1.300 inches. This scale was designed for use with common rotors for disc brakes now being used in the automotive industry. Of course, it is to be understood that the scale could be varied if necessary within the scope of this invention.

Figure 2:
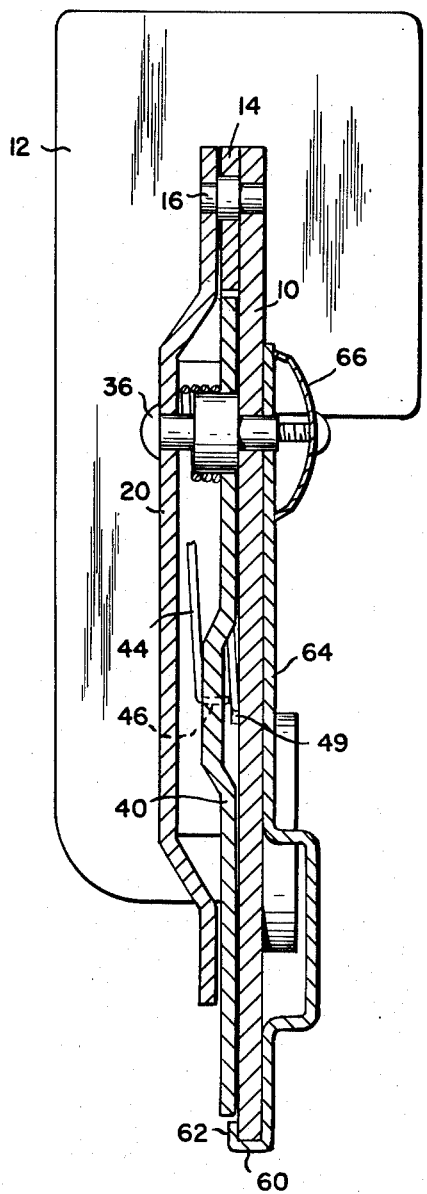
FIG. 2 is a section taken as indicated by the lines and arrows 2—2 in FIG. 1.

Fixedly attached to the body is a base 12 which is arranged to be perpendicular to the plane of the body. As shown more clearly in FIG. 2, the base extends on either side of the body to provide a flat plane surface presenting itself to the rack 14. The rack is supported along one edge of the body by a plurality of shouldered studs 16 and 18 which are pressed into the body 10 and the coverplate 20, and space the plate and body apart. The coverplate extends over a large portion of the body and its arcuate edge stops short of the scale 11 and is supported at either end by screws 22 and 24 which pass through spacer bushings and are fastened in the body 10 so that the plate 20 is maintained in spaced relation to the body 10.

Elongated holes 25 and 26 are provided in the rack 14 which along an axis A perpendicular to the base plate 12. The lead end of the rack has a beveled edge terminating in a point 28 which lies on the axis A. The trailing end of the rack has a handle 30 similar to that of a key. The rack is in a close sliding fit between the coverplate 20 and the body 10 and the studs 16 and 18 are in a sliding fit in their respective elongated slots.

Along the edge of the rack which is disposed between the coverplate and the body, a gear 32 has been cut to run parallel to the axis A. The gear is designed to mate with the pinion 34. The pinion 34 is mounted to rotate about a stud 36 which is securely fastened to the body 10 and coverplate 20. Extending from one side of the pinion 34 is a pointer arm 40 having a V-shaped point 42 at the outwardly extending end thereof disposed to overlie the indicia on the scale 11 and to indicate the reading being made.

It will be apparent from what has been disclosed thus far that upon movement of the key-shaped rack 14 to the left or right the pinion 34 will be swung about the stud 36 and the pointer will move along the scale.

To aid in making readings on a rotor, the pinion-pointer is spring biased to drive the rack 14 toward the base plate 12. The means for biasing the pointer comprises a coiled spring 44 disposed about the stud 36 in a spaced relation therefrom and having a hook 46 at one end engaging the pointer arm 40, while the other end 48 passes through a slot 49 in the side of the coverplate 20.

The pointer arm 40 is bent in a U-shape to accommodate the hook 46 of the spring, so that the spring clears the surface of the body 10. The normal condition of the spring 44 is compressed, so that as it tries to unwind, the pinion is rotated counterclockwise about the stud 36 (when viewed as in FIG. 1). Since the pinion is freely rotatable in the stud and the rack is readily slideable in its mountings, the effect of this spring action is to cause the rack to move toward the base plate. Thus when a rotor, such as the rotor 50 in FIG. 1, is disposed between the rack and the base plate, the rack would normally engage the face of the rotor. The distance at which the end of the rack is positioned from the base plate when the rack is against the face of the rotor will be shown by the pointer on the scale.

It's desirable when using this gauge to have an indication readily visable of what the optimum desired readings should be. In this regard we have provided a means for manually indicating the optimum desired reading prior to taking a measurement with a gauge. The manual indicator 60 embraces the arcuate edge of the body 10 with a inwardly directed pointer 62 and extends around the rear of the gauge with a long arm 64 best illustrated in FIG. 3. The arm 64 is pivotally connected to the stud 36 which extends through the arm and the spring washer 66 and is then rolled over. The spring washer is in compression between the rolled head of the stud and the arm 64, so that while the pointer 62 may be readily moved by hand to any point on the scale 11, it will not move of its own accord. Thus it will remain in the spot to which it is moved. The arm 64 is bent in a U-shape, so as to provide a convenient means for engaging the arm with the index finger and moving it along the scale.

In operation a mechanic will check the original manufacturer's specification for rotor thickness, and then preset the manual indicator 62 to the original thickness position on the scale. To reiterate each scale line equals 0.010 inches. Holding the gauge in one hand, he will then grip the handle 30 and pull the rack away from the base plate 12. With the gauge in this position, he will slip the gauge over the disc brake rotor and hold the base plate flat against one side of the rotor as in FIG. 1. Then he will release the handle and the rack 14 will engage the other face of the rotor as shown in phantom in FIG. 1. If the rotor is not worn, both the preset indicator 62 and the pointer 42 will be at the same place.

FIG. 1 shows the gauge in its position in full lines wherein it has just been inserted over the rotor 50 and the base plate 12 laid flat against it. Note that the pointer 42 is to the left of the manual indicator 62. When the rack is released and the point 28 of the rack engages the rotor as shown in phantom, the pointer will move to the manual indicator position 62 as long as the rotor is exactly what it should be in accordance with the manufacturer's original specifications. However, if the rotor is worn the pointer will move farther to the right as shown in phantom (that is, counterclockwise about the stud 36) and the difference between the manual indication at 62 and the phantom reading will show the wear of the rotor.

To check the depth of scores in the rotor, the previous steps are repeated and in addition the mechanic will move the gauge instrument radially in and out with the plate 12 held firmly against one surface, allowing the point 28 to traverse over the other surface. The tapered point on the rack will go into the low spots and over the high spots, while the mechanic checks the variance on the scale. As previously indicated, the range of the scale if from approximately three-eighths of an inch to approximately 1 ¼ inches so as to correspond to disc rotors used on American and foreign manufactured automobiles. To get an accurate check on all surfaces of the rotor, the gauge can be moved circumferentially about the axis of the rotor and different measurements can be taken radially.

Figure 3:
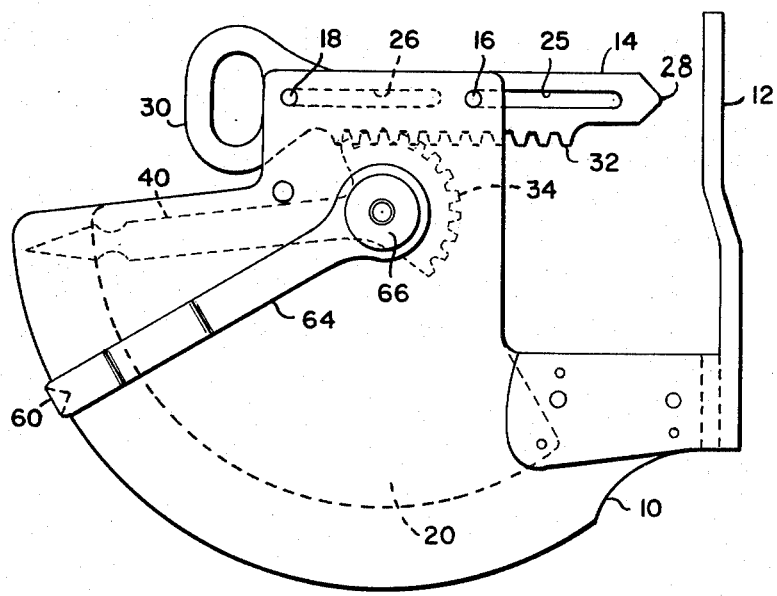
FIG. 3 is a plan view of the other side of the device when viewed as in FIG. 1 with some of the parts shown in alternate positions.

As shown in the rear view FIG. 3 and the rack 14, when inserted fully, positions the pointer 42 at one end of the scale and yet does not touch the base plate 12. This has been compensated for by arranging the scale and the distance which the base plate is spaced from the body 10, so that the scale reads accurately when a rotor is positioned between the rack and the base plate. Thus in the position shown the rack would be positioned 0.300 inches from the base plate.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent Office, and is not intended to limit the score of the invention described and claimed herein.

What is claimed is:

1. A disc brake rotor thickness wear and score depth gauge, comprising: a body having one arcuate edge and a flat plane departing from said edge having indicia disposed along said flat plane and terminating along said edge; said body having a thin, flat plate extending therefrom transversely with respect to said flat plane, a portion of said thin flat plate being offset from the remainder thereof; a rack, slidably mounted on said body for movement substantially perpendicularly toward and away from the flat surface of said plate, said rack having a V-shaped pointer on one end thereof, said end being closest to said plate, said rack having gripping means at the other end thereof, said gripping means comprising an enlarged handle portion; a plurality of pins fixedly mounted in said body; said rack having a plurality of elongated slots therein, each of said slots being disposed about a pin, whereby said rack is in sliding engagement with said plurality of pins; said elongated slots being of predetermined length and retaining said rack so that said rack moves in a perpendicular path with respect to said plate between predetermined limits, said limits being fixed so that the V-shaped pointer end of said rack is always spaced from said thin flat plate; said plate being thinner than the distance between said plate and said V-shaped pointer; a pinion rotably mounted to said body and engaging said rack for movement in response to movement of said rack and having a pointer connected thereto extending therefrom overlying said indicia to cooperate with said indicia for directly indicating measurements corresponding to the distance between the V-shaped pointed end of said rack and the closest surface of said flat plate; said pointer being spring biased by a spring means engaging said pointer and said body to urge said rack toward said plate; a cover portion overlying said spring and pinion and rack and being fixedly attached to said body; said pointer extending from beneath said cover plate and being free to traverse along said indicia in response to movement of said rack; and a separate indicator means pivotally connected to said body for movement to a plurality of fixed positions along said indicia, said separate indicating means comprising a pointer overlying said indicia and cooperating with said indicia for making predetermined fixed indications along said indicia; said separate indicator means embracing said arcuate edge; said separate indicator means being frictionally engaged with said body whereby said pointer is held in the positions to which it is moved.

2. A method of measuring disc brake rotor thickness and score depth by use of a gauge having a body with an arcuate scale along one flat surface and a flat plate extending from said body transversely to said flat surface and a rack spaced from said flat plate and retained on said body to move perpendicularly with respect to said thin flat plate, said rack having a V-shaped pointed end on the end thereof closest to said thin flat plate, said rack engaging a pinion having a pointer extending therefrom overlying said indicia to directly indicate in cooperation with said indicia the distance between the end of said V-shaped end of said rack and said thin flat plate; said pointer being spring biased to drive said pinion and said rack toward said thin flat plate; and an additional manual indicator pivotally and frictionally engaging said body having an additional pointer at the free end thereof overlying said indicia and being capable of being manually moved to a plurality of predetermined positions in which it will remain until moved again; comprising the steps of: manually inserting the thin flat plate into an assembled disc brake so that the surface of the thin flat plate closest to the pointed end of the rack engages one radially extending surface of the rotor of the disc brake, while simultaneously withdrawing the rack so that the pointed end clears the edge of the rotor so that the gauge can be fully inserted about the rotor, whereby the plate and pointed end embrace the radially extending surfaces of the rotor; next moving the flat plate so that it lies flush against the radially extending surface of the rotor which it had previously engaged; next releasing the rack to allow the spring biasing means to force the rack against the other radially extending surface of the rotor; next withdrawing the gauge from the disc brake assembly while simultaneously observing the position of the pointer extending from the pinion overlying the indicia to observe the directly indicated measurements of disc brake rotor thickness.

3. The invention of claim 2 wherein the additional step of first presetting the manual indicator for the manufacturer's original thickness of a particular disc brake rotor by moving the pointer of the additional manual indicator to the appropriate position overlying the indicia on the body.

4. The invention of claim 2 wherein the additional step of moving the gauge radially in and out and then moving the gauge circumferentially about the axis of the rotor to a plurality of positions wherein the gauge is moved radially in and out, so that additional measurements can be observed.

* * * * *